July 15, 1930.  J. S. DUNN  1,770,481
ELECTRIC HEAT CONTROL APPARATUS
Filed Jan. 3, 1929
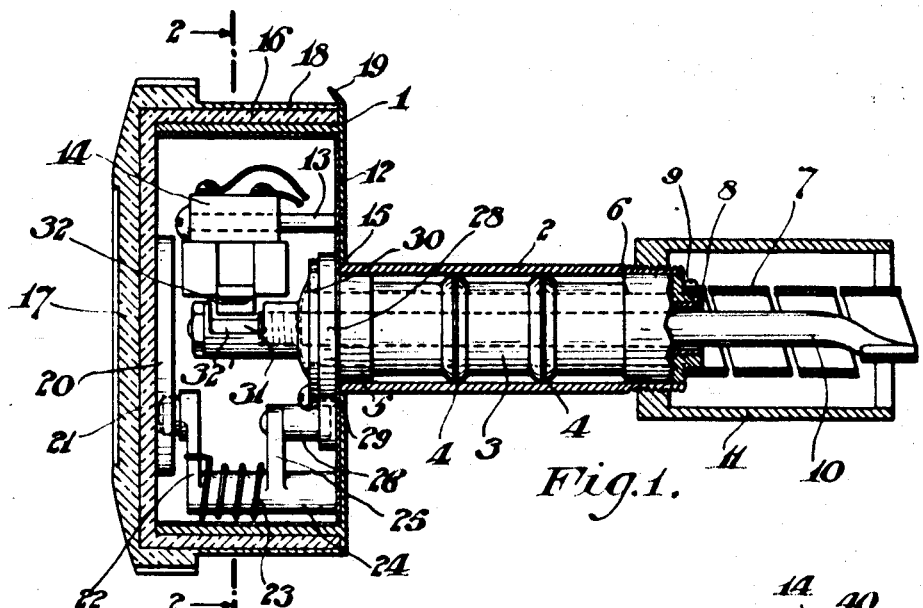

Patented July 15, 1930

1,770,481

UNITED STATES PATENT OFFICE

JOHN STRUTHERS DUNN, OF PHILADELPHIA, PENNSYLVANIA

ELECTRIC HEAT-CONTROL APPARATUS

Application filed January 3, 1929. Serial No. 330,120.

My invention relates to electric heat control apparatus, and more particularly to a thermostatically controlled switch for controlling supply of current to electric heater elements.

My invention resides in controlling means for electric heater circuits comprising a thermostatic element and a circuit controller adapted to be actuated thereby, said circuit controller having a resilient supporting arm for the movable contact and said arm having such characteristics that movement of said contact to fully open or closed positions is effected in part by the arm itself and by a relatively small degree of movement of its actuating means.

My invention resides in a system and apparatus of the character hereinafter described and claimed.

It has been prior practice to control the circuits of electric heaters by a relay in turn controlled by a thermostatically actuated mercury switch. The usual type of mercury switch comprises an envelope of insulating material as glass, having a pair of contacts extending through and spaced within the envelope, and a body of mercury movable within the envelope and adapted to bridge said contacts. The use of a mercury switch in this connection, however, has proved to be disadvantageous in several important respects. For example, where a close regulation of the temperature limits is desired, it has been found that the mercury switch is too insensitive to obtain such regulation. This may in part be due to the fact that as a mercury switch is used over an appreciable length of time, certain chemical reactions within the switch envelope take place due to the arcing across the contacts, thereby forming substances which tend to make the movement of the mercury body more sluggish. Accordingly when the thermostatic element moves through a range representative of a predetermined variation in temperature, the operation of the mercury switch is apt to be uncertain, since its time of operation depends entirely upon the mobility of the mercury body within the switch envelope, it being apparent that the mobility or activeness of the mercury should be the same for a given degree of inclination of the switch envelope. Also, initial leveling is difficult and the pigtail connections often break or short circuit. In addition to erratic or unreliable control, with respect to the close temperature limits desired, a mercury switch has a further disadvantage, in that it is liable to fail altogether after continued use to open or close the relay circuit controlling supply of current to the heater elements. It has been found that mercury switches in actual practice often fail entirely, due to chemical action within the switch envelope or other reasons, after several months of service in connection with electric ranges, for example.

Whatever the cause of these failures, the fact remains that mercury switches have proven inadequate and unreliable for attaining constant temperature regulations for variations of two to five degrees F. and continuing constant and accurate regulation for indefinite periods of time.

To overcome these disadvantages, I provide sensitive circuit controlling means which is actuated by relatively small degree of movement of the thermostatic element, the contacts of the circuit controlling means being practically indestructible at the normal relay actuating currents usually employed.

For an understanding of my invention reference is to be had to the accompanying drawing in which:

Fig. 1 is a longitudinal sectional view of a thermostatically actuated circuit controller.

Fig. 2 is a sectional plan view taken along the line 2—2 of Fig. 1.

Fig. 3 is a view similar to Fig. 2, showing the circuit controller in closed position.

Fig. 4 is a detailed view of the circuit controller.

Fig. 5 is a diagrammatic view of a heater control system.

Referring to Fig. 1, a cylindrical casing or housing 1 has secured at one end thereof a tubular member 2 within which is rotatably mounted a hollow shaft 3. Shaft 3 is designed so as to have a relatively small bearing surface upon its supporting tube or bearing 2, and to this end has mounted thereon collars 4 converging to relatively small bearing portions. Collars 5 and 6 are also mounted upon shaft 3 at the opposite ends thereof. A thermostatic element 7, which may be a bi-metallic strip in helical form, has one end secured to a shoulder 8 of collar 6, as by a screw 9, and the other end secured to the free end of rod 10 which is freely rotatable within hollow shaft 3. A cylindrical protecting casing 11 open at its outer end is mounted upon the end of the tube 2, as by threaded engagement, to protect the thermostatic element from mechanical injury.

Housing 1 comprises a base member 12 having mounted thereon, as by stud 13, a switch casing 14 which will be presently described. Base 12 has a circular opening 15 centrally thereof through which tube 2 extends. A cap member 16 having a top portion 17 fits over the outer walls of housing 1, and is rotatable with respect thereto. A circular metallic strip 18, which is graduated to indicate different temperatures is secured to the outer surface of cap 16 and co-operates with a pointer 19 rigidly mounted upon base 12.

Within cap 16 and upon the inner side of top 17 is mounted a stationary cam element 20, which upon rotation of cap 16 is adapted to co-act with adjusting means for determining the relative position of the thermostatic element with respect to the circuit controlling means.

To this end, the actuating surface of cam 20 is adapted to engage lug 21 carried by arm 22 which is mounted on rotatable shaft 24, which also carries arm 25. Arms 22 and 25 being rigidly mounted with respect to each other, are normally urged toward stop pin 27ª and the cam actuating surface of cam 20 by a spring 23 surrounding shaft 24 co-acting with casing 1. Arm 25 has mounted thereon a lug 26 which bears between opposing portions 27 of a bifurcated member which comprises an extension of disc 28. Disc 28 has an opening centrally thereof through which rod 10 and shaft 3 extend, and is connected frictionally, as by an adjusting screw 29, to a collar 30 mounted upon shaft 3.

Rotation of cap 16 therefore, and consequently cam 20, will cause rotation of disc 28 and shaft 3, which is in frictional engagement therewith, to move thermostatic element 7 with respect to rod 10.

Rod 10 extends through and beyond collar 30, being freely rotatable within the same, and has secured at its outer end within casing 1 a cam element 31 having an actuating surface 32'.

Referring more particularly to Figs. 2 and 3, cam 31 is shown in co-operating relation with a resilient arm 32 secured at 33 to a casing 34. Casing 34 forms with switch mounting 14 a cover or enclosing structure for switch contacts 35 and 36. Contact 36 is fixed with respect to mounting 14 and is electrically connected, as by conductor 37, to binding post 38, which in turn is electrically connected by a conductor, not shown, to terminal 39. Movable contact 35 is carried by a resilient strip 40 of conducting material which is secured at one end, as by screws 41, to mounting 14. A conducting member 42 electrically connects strip 40 with a binding screw 43 connected by conductor 44 to terminal 45. Resilient strip 40 is formed so that it normally tends to assume a curvilinear or non-planar shape, and to take the position shown in Fig. 3, in which the contacts are in the fully closed position. An adjustable abutment 46 which may be moved with respect to strip 40 by rotation of screw 47, serves as a fulcrum about which strip 40 may be flexed. A pin 48 freely movable within cover 34 transmits pressure to strip 40 between abutment 46 and screw 41 in response to movement of cam actuated arm 32.

Referring particularly to Fig. 3, cam 31 is shown engaging arm 32 and exerting a certain amount of pressure upon strip 40 through pin 48. Further rotation of cam 31 through a relatively small angle will cause sufficient pressure to bear upon strip 40 as to cause contact 35 to suddenly rotate about abutment 46, and to move away from fixed contact 36 and against a stop member 50 with a snap action. In other words the relatively small movement of pin 48 causes sufficient distortion of the strip 40 between abutment 46 and screw 41 to cause strip 40 to move from its normal curvilinear shape, beyond its neutral plane, and into a position where it takes a shape of reverse curvature, as compared with its normal curvature. This action in itself is well known, and forms the principle upon which various types of snap switches are designed.

As long as pin 48 exerts sufficient pressure, which is comparatively slight, upon strip 40, the contacts will remain in the fully open position as indicated in Fig. 2, but upon release of pressure due to rotation of cam 31 in such direction that arm 32 moves away from cover 34, strip 40 through its inherent resiliency will snap back to the position shown in Fig. 3 and will remain in such position until cam 31 moves again to its predetermined actuating position.

A detailed illustration of the switch is shown in Fig. 4. Movable contact 35 is carried by the bifurcated strip 40, there being a V-shaped slot 51 having at its apex a hole 52 of small diameter formed in strip 40. The edges of hole 52 form a bearing surface for the pin 48, which is of larger diameter, the position of hole 52 bearing a predetermined relation to abutment 46 and mounting 41 for a given degree of sensitiveness of the switch.

Adjustment of the thermostatic element at its initial position is accomplished by loosening screw 29 and moving member 28 relative to collar 30 which is in fixed relation to shaft 3. Movement of member 28 also effects movement of arm 25, and consequently, the positioning of lug 21 with respect to cam 20. When the initial adjustment of the thermostat has been determined, depending on the range of temperatures to be encountered, screw 29 is tightened so that members 28 and 30 move as one member. The temperature at which the circuit breaker is to be actuated is determined by rotation of cap 16 through its cover 17 to a position where the pointer 19 indicates the desired temperature upon scale 18. Rotation of cap 16 causes cam 20, which is secured integrally thereto, and which of course is in cooperative relation with respect to scale 18, to engage through its actuating face the lug 21, thereby rotating arms 22 and 25 about shaft 24 and moving member 28 by means of lug 26.

Since there is now a positive connection between the temperature adjusting cam 20 and shaft 3, shaft 3 will be rotated in accordance with rotation of cam 20, and will accordingly produce torsional stresses in the helical thermostatic element 7, which stresses are relieved by imparting a certain degree of rotation to the free end of rod 10 to which the opposite end of the thermostatic element is attached. Rod 10, being freely rotatable within shaft 3, is accordingly moved through an angle dependent upon the degree of movement of cam 20, and consequently the cam actuating face of cam 31 is rotated with respect to arm 32 so that either a greater or a lesser degree of rotation than heretofore is required for the cam to engage said arm, and consequently to actuate the circuit breaker.

Fig. 5 shows diagrammatically a current supply system for electric heater elements 53 and 54 connected through conductors 55 and 56 to a source of current E. A switch 57 is adapted to connect either one resistant or both of them in series across the source for generating different degrees of heat. A circuit breaker 58 is adapted to make or break connections to the heater elements from the source of supply, and the switch is actuated by electro-magnetic means 59 in turn energized through a battery or other source of power 60 and a thermostatically controlled circuit breaker indicated by contacts 35 and 36 of the character above described.

The operation of the system shown in Fig. 5 is apparent, and it need only be stated that when the thermostatic element is in the position representative of a lower degree of heat than that desired, contact 35 is in engagement with contact 36, thereby energizing a relay coil 59 and closing switch 58 so that current may flow through the heater elements. When the temperature of the elements reaches a predetermined high value, contact 35 through its thermostatic actuator moves to open position as shown, and the coil 59 is deenergized and the circuit opened.

I have found that due to the sensitiveness of the circuit breaker a very close adjustment for temperature variation may be provided for, and as a matter of fact control within temperature variations of but two degrees to five degrees F. is possible with my invention. Furthermore, since the contact members may be made of any suitable conducting material to resist the effects of arcing, and particularly since the arcing itself is greatly minimized due to the rapid snap action of the switch, the life of the circuit breaker will be practically indefinite, and there will be no necessity of frequent replacements, as is necessitated by the use of mercury switches. Furthermore the circuit breaker will always act at the same pressure, as exerted by pin 48, and there will be no erratic action of the switch contacts as is generally the case with mercury switches after a certain amount of use.

It will be understood that a reasonable degree of departure may be made from the construction above described without departing from the spirit of my invention, and particularly with respect to the thermostatic actuating means for the circuit controller.

What I claim is:

1. In control apparatus of the character described, a support, a thermostatic element movable in response to varying degrees of heat to which the same may be subjected, a member rotatable by said element, switch operating means engaged by said member in different positions thereof, a switch mounting secured to said support, stationary and movable contacts secured to said mounting, said movable contact carried by a resilient member normally curvilinear in form, and means interconnecting said operating means and last-named member whereby a relatively small degree of movement of said thermostatic element changes the curvilinear form of said member to initiate movement thereof and effect either fully open or closed positions of the switch.

2. In control apparatus of the character described, a support, a thermostatic element movable in response to varying degrees of heat to which the same may be subjected, a member rotatable by said element, switch operating means yieldingly engaged by said member in different positions thereof whereby independent movement of said member with respect to said operating means is permitted, a switch secured to said support comprising fixed and movable contacts, said movable contact carried by a flexible strip tending to normally assume a curvilinear form and having such characteristics that movement of said contact to fully open or closed position is effected by initial movement of said operating means and thereafter by movement of the flexible strip itself into or out of its normal form.

3. In control apparatus of the character described, a support, adjusting means rotatable within said support, a thermostatic element secured to said means and to a member rotated thereby, a cam mounted on said member for yieldingly engaging a switch actuator, a switch casing mounted upon said support and enclosing contact members, one of said contact members carried by a flexible strip tending normally to assume a non-planar form, and means for transmitting movement from said actuator to said strip whereby initial movement of said strip is effected, the completed movement being effected by the inherent resiliency of the strip itself.

4. Apparatus for controlling supply of current comprising a thermostatic element movable in accordance with temperature conditions to which the same may be subjected, a cam member actuated thereby, an operating arm coacting with said cam member, and a relatively sensitive switch member of the snap-over type adapted to be moved to either fully open or closed position by relatively small degree of movement of said cam member.

5. Apparatus for controlling supply of current comprising a thermostatic element movable in accordance with temperature conditions to which the same may be subjected, a cam member rotatable by said thermostatic element, a resilient operating arm coacting with said cam element, a support for fixed and movable contacts, said movable contact carried by a resilient member normally tending to assume a non-planar shape, and means interposed between said operating arm and resilient member for transmitting pressure thereto causing change in its shape to initiate movement thereof whereby said movable contact continues to move by snap action either into or out of engagement with said fixed contact.

JOHN STRUTHERS DUNN.